(12) United States Patent
Marason et al.

(10) Patent No.: US 6,678,100 B1
(45) Date of Patent: Jan. 13, 2004

(54) DUAL COMPLEMENTARY TWO-COLOR OPTICS WHICH ENABLES A USER TO SEE TRUE NEUTRAL COLOR

(75) Inventors: Thomas S. Marason, Monrovia, CA (US); Glenn R. Willey, Big Bear City, CA (US)

(73) Assignee: Pacific Beach, Inc., Monrovia, CA (US)

( * ) Notice: Subject to any disclaimer, the term of this patent is extended or adjusted under 35 U.S.C. 154(b) by 0 days.

(21) Appl. No.: 10/393,548

(22) Filed: Mar. 20, 2003

(51) Int. Cl.[7] .................................................. G02B 5/22
(52) U.S. Cl. ........................ 359/888; 359/885; 351/163; 351/165
(58) Field of Search ................................ 359/888, 890, 359/891, 885, 722, 723; 351/162, 163, 165, 44, 213

(56) References Cited

U.S. PATENT DOCUMENTS

| | | |
|---|---|---|
| 4,793,669 A | 12/1988 | Perilloux |
| 4,896,928 A | 1/1990 | Perilloux |
| RE33,729 E | 10/1991 | Perilloux |
| 5,054,902 A | 10/1991 | King |
| 5,173,800 A | 12/1992 | King |
| 5,408,278 A * | 4/1995 | Christman .................... 351/44 |
| 5,731,898 A | 3/1998 | Orzi |
| 6,145,984 A | 11/2000 | Farwig |
| 6,250,759 B1 * | 6/2001 | Kerns .......................... 351/165 |
| 6,334,680 B1 | 1/2002 | Larson |
| 2002/0018824 A1 | 2/2002 | Buazza |

FOREIGN PATENT DOCUMENTS

GB  2054900  * 2/1981

* cited by examiner

Primary Examiner—Drew Dunn
Assistant Examiner—Leo Boutsikaris
(74) Attorney, Agent, or Firm—Thomas I. Rozsa; Tony D. Chen

(57) ABSTRACT

A pair of dual complementary optics having a first lens and a second lens wherein the first lens has a gradient of a multiplicity of bands, the uppermost series of bands having a primary color embedded therein and the lowermost series of bands having a complementary secondary color embedded therein, the second lens having the inverse color embedded therein so that a primary color in the first lens is aligned with a secondary color in the second lens and a secondary color in the first lens is aligned with a primary color in the second lens. Each lens is darkest on top and lightest on the bottom. Each lens transmits more than 50% visible light in both wavelength ranges 440–550 nm and 550–750 nm.

53 Claims, 1 Drawing Sheet

LENS 1

LENS 2

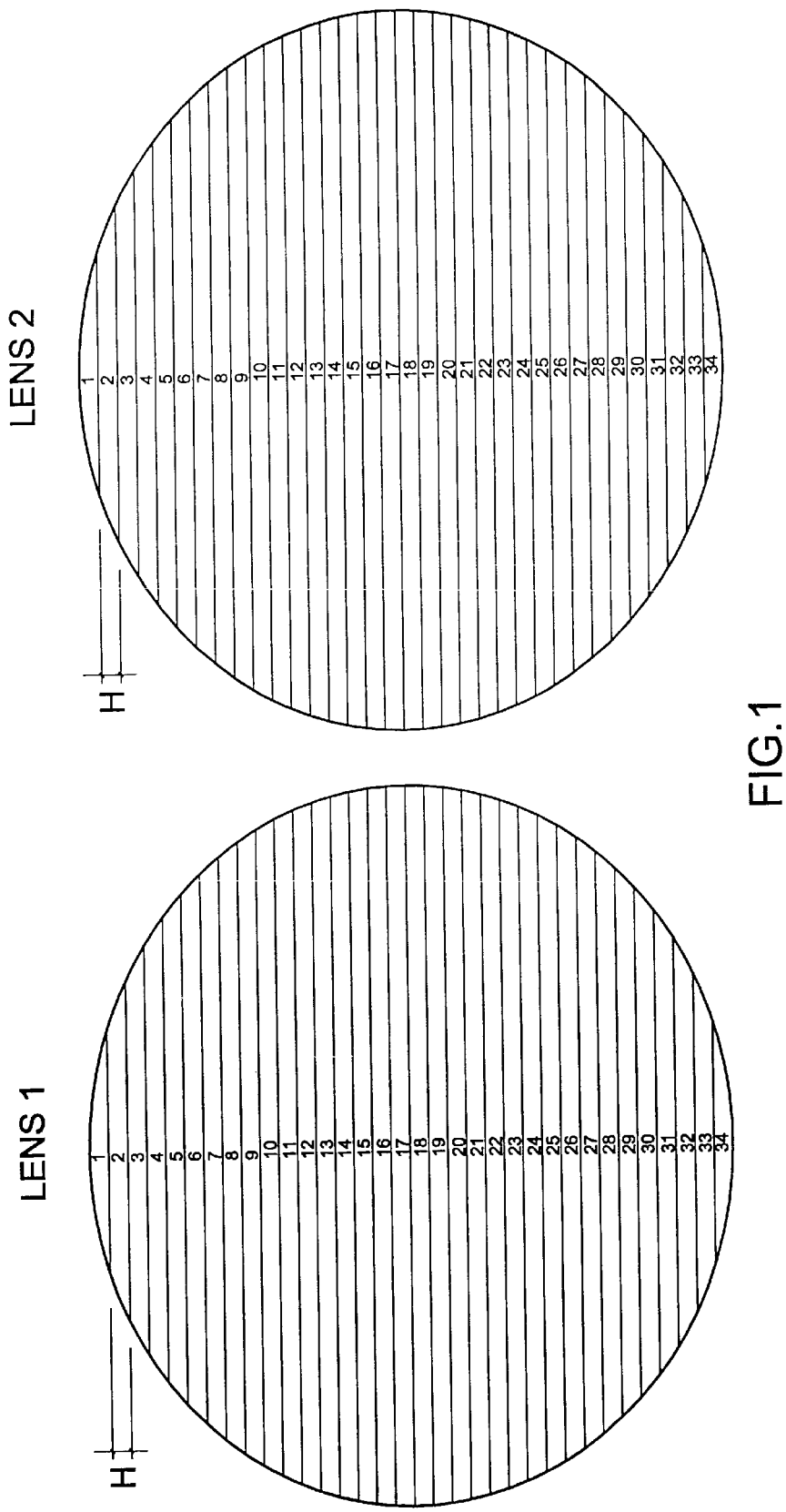

DUAL COMPLEMENTARY TWO-COLOR OPTICS WHICH ENABLES A USER TO SEE TRUE NEUTRAL COLOR

BACKGROUND OF THE INVENTION

1. Field of the Invention

The present invention generally relates to the technical field of optics such as sunglasses, contact lenses, goggles and binoculars and more particularly, the present invention relates to the field of optics such as sunglasses which enables a user to see true neutral color and not have the vision distorted by the tinted color of the sunglasses.

2. Description of the Prior Art

In the past, individuals have sought to improve optics by providing various innovations to lenses. The following ten (10) patents are pertinent to this field of art:

1. U.S. Pat. No. 4,793,669 issued to Perilloux on Dec. 27, 1988 for "Multilayer Optical Filter For Producing Colored Reflected Light And Neutral Transmission" (hereafter the "'669 Perillouk Patent");
2. U.S. Pat. No. 4,896,928 issued to Perilloux on Jan. 30, 1990 for "Chromatically Invariant Multilayer Dielectric Thin Film Coating" (hereafter the "'928 Perilloux Patent");
3. U.S. Pat. No. 5,054,902 issued to King on Oct. 8, 1991 for "Light Control With Color Enhancement" (hereafter the "'902 King Patent");
4. U.S. Pat. No. Re. 33,729 issued to Perilloux on Oct. 29, 1991 for "Multilayer Optical Filter For Producing Colored Reflected Light And Neutral Transmission" (hereafter the "'729 Perilloux Patent");
5. U.S. Pat. No. 5,173,800 issued to King on Dec. 22, 1992 for "Light Control With Color Enhancement" (hereafter the "'800 King Patent");
6. U.S. Pat. No. 5,731,898 issued to Orzi on Mar. 24, 1998 for "Optical Filter Arrangement" (hereafter the "Orzi Patent");
7. U.S. Pat. No. 6,145,984 issued to Farwig on Nov. 14, 2000 for "Color-Enhancing Polarized Lens" (hereafter the "Farwig Patent");
8. U.S. Pat. No. 6,250,759B1 issued to Kerns on Jun. 26, 2001 for "Eyeglass Lens With Multiple Optical Zones Having Varying Optical Properties For Enhanced Visualization Of Different Scenes In Outdoor Recreational Activities" (hereafter the "Kerns Patent");
9. U.S. Pat. No. 6,334,680B1 issued to Larson on Jan. 1, 2002 for "Polarized Lens With Oxide Additive" (hereafter the "Larson Patent");
10. U.S. Pat. No. 2002/0018824A1 issued to Buazza on Feb. 14, 2002 for "Plastic Lens Systems, Compositions, And Methods" (hereafter the "Buazza Patent");
11. U.S. Pat. No. 5,408,278 issued to Christman on Apr. 18, 1995 for "Method And Device For Enhancing Visual And Color Perception" (hereafter the "Christman Patent").

The three Perilloux Patents disclose optical filters of varying coloration. Specifically, the '669 Perilloux Patent has as its unique feature a coating on the substrate's surface including layers of material having a high refractive index and substantially quarter-wave optical thickness alternating with layers of material having low refractive index and substantially quarter-wave optical thickness, the thickness of each of said layers being selected so that the lens has a reflectance spectrum with a ripple over a first segment in the visible range but has no significant ripple in a second segment in the visible range, so that reflected light having wavelength within the first segment is sufficient to give the filter a desired aesthetic color, and the thickness of each layer being selected so that the lens reflects substantially all electromagnetic radiation having wavelengths in the near-infrared range.

The '928 Perilloux Patent is an improvement on the prior device. In this case, the technology is the same but the improvement is that the desired aesthetic color in the lens is substantially independent of incidence angle.

The third in the group which is the '729 reissued Perilloux Patent essentially is a similar innovation which includes a short-wave-pass optical filter that includes a partially absorbing or transparent substrate coated by a set of layers having specified quarter-wave optical thickness, and is designed to reflect visible radiation of a selected color while transmitting visible radiation and maintaining a neutral color balance. The coating includes layers having a high refractive index alternating with layers having a low refractive index. The refractive indices and layer thicknesses are selected so that the filter's reflectance spectrum exhibits a ripple over a first segment of the visible spectrum but no significant ripple over a second segment of the visible spectrum. The filters may be used as sunglass lenses that have a selected color (such as blue, orange, or violet) when viewed by one other than the sunglass wearer, while permitting the wearer to perceive transmitted light with a correct color balance. The design of the inventive filter is preferably optimized to have the desired optical properties while being conveniently and repeatably manufacturable.

The '902 King Patent discloses a method for maintaining optical neutrality for the user while projecting a color scheme to an outside observer. Overall, the innovation of the '902 King Patent can be summarized in claim 1 which recites "A lens for sunglasses which recites (1) a light transmissive substrate constituting the lens body, and having a first side for facing the wearer and a second side for facing outwardly from the wearer; (2) a semireflective layer intimately bonded to the second side; and (3) a dielectric layer over the semireflective layer, said dielectric layer being of substantially uniform thickness."

The '800 King Patent deals with light control on a window as opposed to light control used with glasses.

The Orzi Patent discloses a method for the creation of a filter using bronze, purple or blue while maintaining optical neutrality. It includes an optical filter arrangement which comprises at least two optical filter elements including a transparent substrate and an optical coating typically comprising at least two overlying optical thin films. The coating defines a first patterned area and a second surround area bordering the first area. The first area has substantially the same optical transmittance characteristics as the second area and different optical reflectance characteristics over at least a portion of the visible spectrum. The distinction between the first area and the second area is visually perceptible when viewed from one side of the optical filter arrangement and substantially visibly imperceptible when viewed from the opposite side of the optical filter arrangement. As a result, a colored pattern or logo is only visible when viewed from one side of the filter arrangement.

The Farwig Patent discloses a method for rendering a sunglass lens colorless to the viewer by the use of different colored filtered elements therewithin. It comprises a front lens element and a rear lens element. By way of example, when using a 1 mm. thick rear lens element, the pale purplish color of the glass can be rendered undetectable to the wearer by using a common variety of slightly bluish-grey polarizers having about 25% transmission. Tint-neutralization is also achieved on an uncoated lens by using appropriate tints in the front element and a polarizer. One lens element can be glass, then there is a brown polarizer and a green A lens element which makes a good neutral grey combination.

The Kerns Patent discloses an eyeglass lens having different regions of reflectivity within the lens. Each region is comprised of a different colored tint for increased performance and visualization. There is a first optical zone positioned in the upper portion of the lens body and a second optical zone positioned in the lower portion of the lens body. The concept of this invention is a lens for eyeglasses where there are two or more optical zones on the lens body having different optical properties that enhance visualization of different scenes whether looking up, down, etc. through different portions of the lens body.

The Larson Patent discloses a polarized lens that has improved color discrimination characteristics. It includes a lens wafer containing a rare earth oxide such as neodymium that provides relatively high light transmittance and relatively low light transmittance. A polarized filter is included to reduce glare.

The Buazza Patent discloses a method for the combination of various colors including blue, yellow, green and red, to produce a neutral optical filter for sunglasses. It discloses an apparatus for preparing a plastic eyeglass lens which includes a coating unit and a lens curing unit. The apparatus is preferably configured to allow the operation of both the coating unit and the lens curing unit. The apparatus may also include a post-cure unit and a controller. The controller is configured to control the operation of the coating unit, the lens curing unit and the post-cure unit. A lens forming composition may include an aromatic containing polyether polyethylenic functional monomer, a photoinitiator, and a coinitiator. The lens forming composition may be cured by the application of activating light or activating light and heat.

The Christman Patent discloses a device to enhance visual color perception; however, each lens is limited by the fact that each lens transmits over fifty percent of light in either the wavelength range 400–550 nm or 550–750 nm while transmitting less than fifty percent of the visible light in the other of these ranges.

There is still a significant need to provide a cost effective and efficient way to produce tinted optics such as sunglasses which enable a user to see true white light.

SUMMARY OF THE INVENTION

The present invention relates to the field of optics, and primarily sunglasses, although other optics which have two viewing lenses such as binoculars, goggles and contact lenses are also capable of utilizing the innovation of the present invention.

The present invention is a significant innovation in the field of optics such as sunglasses wherein a user benefits from tinting the lenses of the sunglasses to provide the beneficial effects of shading the wearer's eyes from the sun while at the same time enabling the user to see true neutral color and not have the vision distorted by the tinted color of the optics.

In a previous embodiment of an invention created by one of the inventors of the present invention, it was discovered that by wearing a pair of complementary lenses, a primary colored lens over one eye and a secondary colored lens over the other eye, the wearer's visual cortex in the wearer's brain will cause the brain to see true neutral color in spite of the colored lenses.

A significant improvement of this previous embodiment has now been discovered. Specifically, instead of having one primary color in one lens and a secondary color in the other lens, it has now been discovered that by having both a primary color and a secondary color in the same lens, and arranged so that one lens has a primary color on the upper portion of the lens and a secondary color on the lower portion of the lens while the second lens is inversely arranged with the secondary color on the upper portion of the lens and a primary color on the lower portion of the lens, the wearer s visual cortex in the wearer's brain will cause the brain to see true neutral color in a better clearer way in spite of the colored lenses.

It has further been discovered according to the present invention, that if more than fifty percent (50%) of the light is transmitted through the combined primary color and the secondary color in each lens so that less than fifty percent (50%) of the light is absorbed by each lens, then the wearer experiences better contrast control when walking from bright light into a dimly lit room.

It has additionally been discovered that if each color in each lens has a multiplicity of bands having a variation in color density from the most dense at the upper portion of the lens and decreasing in density as the bands of color density progress toward the bottom of the lens, then the ability to transmit more than fifty percent (50%) of the total light through both the primary color and the secondary color of each lens is achieved. In addition, this achieves better apparent brightness while giving necessary shading, thereby allowing the wearer to see true neutral color.

It has also been discovered, according to the present invention, that if the colors have greater color density at the upper portion of each lens and less color density at the lower portion of each lens so that each lens is darker on top and clearer on the bottom, the lens provides better shading from the sun since the sun is above the wearer and the clearer bottom portion enables the wearer to read without diminished illumination.

It has additionally been discovered, according to the present invention, that if the colors have greater color density at the upper portion of each lens and less color density at the lower portion of each lens, the lens enables the wearer to have a greater apparent brightness by having shading protection of the eye so that the brain sees more than the sum of two individual eyes.

Efficacy is what the eye actually processes from the available light. The cc color density determines the efficacy of what total light the wearer actually sees. It has been discovered, according to the present invention, that the efficacy of each band of a primary color in one lens must be within twelve percent (12%) of the efficacy of the aligned band of the secondary color in the adjacent lens in order to reduce retinal rivalry.

It has therefore been discovered, according to the present invention, that if a lens is divided into approximately 34 horizontal band widths with each band being approximately 1 millimeter in height to thereby create approximately 34 horizontal bands, with slightly more than half the bands on the upper portion of the lens being a primary color in one lens and a secondary color in the opposite lens and slightly less than half of the bands being the secondary color in the first lens and the primary color in the second lens, and with the color density of color being greatest at the upper portion of each lens and gradually decreasing in color density through a gradient as the bands descend on the lens so that each lens is darker on top and gradually becomes less dark as the bands descend toward the bottom of the lens, and if more than fifty percent (50%) of light is transmitted through each lens, and if the efficacy of each aligned band from the first and second lens is within twelve percent (12%), then the beneficial effects described above are achieved.

It has therefore been discovered, according to the present invention, that the beneficial effects described above are achieved by having a gradient of red on the top of one lens and a gradient of cyan on the bottom of the same lens and a gradient of cyan on the top of the second lens and a gradient of red on the bottom of the second lens, so that the matching primary and secondary colors neutralizes filtering and renders objects in true neutral color.

It has also been discovered, according to the present invention, that the beneficial effects described above are achieved by having a gradient of magenta on the top of one lens and a gradient of green on the bottom of the same lens and a gradient of green on the top of the second lens and a gradient of magenta on the bottom of the second lens, so that the matching primary and secondary colors neutralizes filtering and renders objects in true neutral color.

It has also been discovered, according to the present invention, that the beneficial effects described above are achieved by having a gradient of blue on the top of one lens and a gradient of yellow on the bottom of the same lens and a gradient of yellow on the top of the second lens and a gradient of blue on the bottom of the second lens, so that the matching primary and secondary colors neutralizes filtering and renders objects in true neutral color.

It has additionally been discovered, according to the present invention, that the dual complementary color lenses described above which neutralizes filtering and renders objects in true neutral color can also be used with corrective lenses which includes contact lenses and can also be used with other optics utilizing two adjacent lenses such as binoculars and goggles.

It has also been discovered, according to the present invention, that the dual complementary color lenses described above can also be used with ultraviolet and polarizing filters.

It has been discovered, according to the present invention, that by wearing a pair of dual complementary color lens over one eye and an inverse dual complementary color lens over the other eye, the wearer's visual cortex in the wearer's brain will cause the brain to see true neutral color in spite of the colored lenses.

According to the present invention, it has further been discovered that the visual cortex, which is the part of the cerebral cortex and processes visual information, neutralizes the filtering of complementary lenses thereby rendering the objects in true neutral color.

It has therefore been discovered, according to the present invention, that one set of dual complementary color lenses (which is magenta/green in one lens and green/magenta in the other lens) neutralizes filtering and renders objects in true neutral color.

It has therefore been discovered, according to the present invention, that one set of dual complementary color lenses (which is blue/yellow in one lens and yellow/blue in the other lens) neutralizes filtering and renders objects in true neutral color.

It has therefore been discovered, according to the present invention, that one set of dual complementary lenses (which is cyan/red in one lens and red/cyan in the other lens) neutralizes filtering and renders objects in true neutral color.

It has additionally been discovered, according to the present invention, that the dual complementary color lenses which neutralizes filtering and render objects in true neutral color can be used with corrective lenses, which includes contact lenses.

It is therefore an object of the present invention to create optics such as sunglasses to enable a wearer to benefit from ultraviolet and polarizing filters, and to provide the beneficial effects of shading the wearer's eyes from the sun, while at the same time providing a neutralizing filter to render objects in true neutral color.

It is also an object of the present invention to create optics such as sunglasses to enable a wearer to benefit from corrective lenses utilized with the sunglasses, and to provide the beneficial effects of shading the wearer's eyes from the sun, while at the same time providing a neutralizing filter to render objects in true neutral color.

It is also an object of the present invention to utilize a primary and a secondary complementary color lens over one eye and an inverse secondary and primary complementary color lens over the other eye to create a neutralizing effect to enable the user to see neutral color in spite of the tinted colors.

It is also an object of the present invention to create a dual complementary color set of sunglass lenses to create a neutralizing effect, which one dual complementary color lens can be green as the primary color and magenta as the secondary color and the other dual complementary color lens must be inversed with magenta as the secondary complementary color to green (which is in the first lens) and green as the primary complementary color to magenta (which is in the first lens); or with a second set of sunglass lenses wherein one lens is blue as the primary color and yellow as the secondary color and the other dual yellow complementary color to blue (which is in the first lens) and blue as the primary complementary color to yellow (which is in the first lens); or with a third set of sunglass lenses wherein one lens is red as the primary color and cyan as the secondary color and the other dual complementary color lens must be cyan as the secondary complementary color to red (which is in the first lens) and red as the primary complementary color to cyan (which is in the first lens).

Further novel features and other objects of the present invention will become apparent from the following detailed description, discussion and appended claims, taken in conjunction with the drawing.

BRIEF DESCRIPTION OF THE DRAWINGS

Referring particularly to the drawings for the purpose of illustration only and not limitation, there is illustrated:

FIG. 1 is an illustrative:view of a pair of lenses each having a gradient of bands of colors.

CHART 1

| 1 | 2 | 3 | 4 | 5 | 6 | 7 | 8 | 9 | 10 | 11 | 12 | 13 | |
|---|---|---|---|---|---|---|---|---|---|---|---|---|---|
| Location (from top) | | | LENS 1 | T % | T % | T % | Efficacy | LENS 2 | T % | T % | T % | Efficacy | Total |
| % | mm | inch | CC | Total | 400–550 | 550–750 | 400–700 | CC | Total | 400–550 | 550–750 | 400–700 | Tv |
| 3% | 1 | 0.04 | R-68CC | 40.5% | 20.4% | 59.2% | 10.6% | C-120CC | 32.6% | 51.9% | 14.2% | 11.2% | 21.8% |
| 6% | 2 | 0.08 | R-66CC | 41.4% | 21.5% | 59.9% | 11.0% | C-118CC | 33.6% | 53.0% | 15.0% | 11.6% | 22.6% |
| 9% | 3 | 0.12 | R-64CC | 42.4% | 22.6% | 60.7% | 11.4% | C-115CC | 34.6% | 54.2% | 15.8% | 12.0% | 23.4% |
| 12% | 4 | 0.16 | R-62CC | 43.3% | 23.7% | 61.5% | 11.8% | C-113CC | 35.6% | 55.3% | 16.6% | 12.4% | 24.2% |

CHART 1-continued

| 1 | 2 | 3 | 4 | 5 | 6 | 7 | 8 | 9 | 10 | 11 | 12 | 13 | |
|---|---|---|---|---|---|---|---|---|---|---|---|---|---|
| Location (from top) | | | LENS 1 | T % | T % | T % | Efficacy | LENS 2 | T % | T % | T % | Efficacy | Total |
| % | mm | inch | CC | Total | 400–550 | 550–750 | 400–700 | CC | Total | 400–550 | 550–750 | 400–700 | Tv |
| 15% | 5 | 0.20 | R-60CC | 44.2% | 24.8% | 62.3% | 12.2% | C-110CC | 36.6% | 56.4% | 17.5% | 12.8% | 25.0% |
| 18% | 6 | 0.24 | R-58CC | 45.7% | 26.3% | 63.7% | 12.6% | C-108CC | 37.5% | 57.5% | 18.3% | 13.2% | 25.8% |
| 21% | 7 | 0.28 | R-56CC | 47.2% | 27.8% | 65.1% | 13.1% | C-105CC | 38.4% | 58.5% | 19.1% | 13.6% | 26.7% |
| 24% | 8 | 0.31 | R-54CC | 48.7% | 29.3% | 66.5% | 13.6% | C-103CC | 39.3% | 59.6% | 19.8% | 13.9% | 27.5% |
| 26% | 9 | 0.35 | R-50CC | 50.1% | 30.9% | 67.9% | 14.1% | C-100CC | 40.3% | 60.6% | 20.6% | 14.3% | 28.3% |
| 29% | 10 | 0.39 | R-49CC | 50.8% | 31.8% | 68.4% | 14.4% | C-98CC | 41.3% | 61.7% | 21.4% | 14.6% | 29.0% |
| 32% | 11 | 0.43 | R-48CC | 51.5% | 32.7% | 68.9% | 14.7% | C-95CC | 42.2% | 62.7% | 22.2% | 15.0% | 29.7% |
| 35% | 12 | 0.47 | R-47CC | 52.2% | 33.6% | 69.3% | 15.0% | C-93CC | 43.2% | 63.8% | 23.0% | 15.3% | 30.3% |
| 38% | 13 | 0.51 | R-46CC | 52.8% | 34.5% | 69.8% | 15.3% | C-90CC | 44.1% | 64.8% | 23.9% | 15.7% | 31.0% |
| 41% | 14 | 0.55 | R-45CC | 53.5% | 35.4% | 70.3% | 15.6% | C-88CC | 44.6% | 65.1% | 24.7% | 15.9% | 31.6% |
| 44% | 15 | 0.59 | R-44CC | 54.2% | 36.3% | 70.8% | 16.0% | C-85CC | 45.2% | 65.4% | 25.5% | 16.2% | 32.1% |
| 47% | 16 | 0.63 | R-43CC | 54.9% | 37.2% | 71.2% | 16.3% | C-83CC | 45.7% | 65.8% | 26.3% | 16.4% | 32.6% |
| 50% | 17 | 0.67 | R-40CC | 55.5% | 38.1% | 71.7% | 16.6% | C-80CC | 46.2% | 66.1% | 27.0% | 16.6% | 33.2% |
| 53% | 18 | 0.71 | R-35CC | 58.8% | 47.8% | 73.6% | 17.9% | C-70CC | 48.4% | 67.3% | 30.0% | 17.5% | 35.4% |
| 56% | 19 | 0.75 | R-30CC | 62.0% | 57.4% | 75.5% | 19.2% | C-60CC | 55.1% | 73.8% | 36.9% | 19.8% | 39.0% |
| 59% | 20 | 0.79 | C-60CC | 55.1% | 73.8% | 36.9% | 19.8% | R-30CC | 62.0% | 57.4% | 75.5% | 19.2% | 39.0% |
| 62% | 21 | 0.83 | C-57CC | 57.7% | 76.5% | 39.6% | 20.8% | R-27CC | 64.6% | 51.2% | 77.0% | 20.3% | 41.1% |
| 65% | 22 | 0.87 | C-53CC | 60.4% | 79.2% | 42.3% | 21.8% | R-23CC | 67.2% | 55.0% | 78.5% | 21.5% | 43.2% |
| 68% | 23 | 0.91 | C-50CC | 63.1% | 81.9% | 45.0% | 22.7% | R-20CC | 69.8% | 58.8% | 80.0% | 22.6% | 45.3% |
| 71% | 24 | 0.94 | C-45CC | 65.1% | 82.5% | 48.2% | 23.4% | R-19CC | 71.4% | 61.2% | 80.9% | 23.3% | 46.6% |
| 74% | 25 | 0.98 | C-40CC | 67.0% | 83.1% | 51.3% | 24.0% | R-17CC | 73.0% | 63.5% | 81.7% | 23.9% | 47.9% |
| 76% | 26 | 1.02 | C-35CC | 69.2% | 84.0% | 54.9% | 24.8% | R-15CC | 74.5% | 65.9% | 82.6% | 24.6% | 49.3% |
| 79% | 27 | 1.06 | C-30CC | 71.4% | 84.8% | 58.4% | 25.5% | R-13CC | 76.1% | 68.2% | 83.4% | 25.2% | 50.7% |
| 82% | 28 | 1.10 | C-20CC | 76.2% | 86.0% | 66.2% | 27.0% | R-10CC | 79.2% | 72.9% | 85.1% | 26.5% | 53.5% |
| 85% | 29 | 1.14 | C-10CC | 85.3% | 88.3% | 78.5% | 29.2% | R-05CC | 84.1% | 80.3% | 87.6% | 28.5% | 57.8% |
| 88% | 30 | 1.18 | C-10CC | 85.3% | 88.3% | 78.5% | 29.2% | R-05CC | 84.1% | 80.3% | 87.6% | 28.5% | 57.8% |
| 91% | 31 | 1.22 | C-05CC | 87.0% | 89.2% | 84.9% | 30.3% | R-03CC | 90.0% | 90.0% | 95.0% | 35.0% | 65.3% |
| 94% | 32 | 1.26 | C-02CC | 93.5% | 94.6% | 95.5% | 32.3% | R-00CC | 100.0% | 100.0% | 100.0% | 34.4% | 66.7% |
| 97% | 33 | 1.30 | C-00CC | 100.0% | 100.0% | 100.0% | 34.4% | R-00CC | 100.0% | 100.0% | 100.0% | 34.4% | 68.8% |
| 100% | 34 | 1.34 | C-00CC | 100.0% | 100.0% | 100.0% | 34.4% | R-00CC | 100.0% | 100.0% | 100.0% | 34.4% | 68.9% |
| | | | | | 56.0% | 66.4% | | | | 66.7% | 50.4% | | |

Revised Feb 12, 2003

CHART 2

| | T % Total | T % 400–550 | T % 550–750 | Efficacy 400–700 |
|---|---|---|---|---|
| RED | | | | |
| 100CC | 32.2% | 10.6% | 52.2% | 7.3% |
| 90CC | 35.5% | 13.4% | 56.1% | 8.4% |
| 80CC | 37.5% | 16.3% | 57.2% | 9.4% |
| 70CC | 39.5% | 19.3% | 58.4% | 10.4% |
| 60CC | 44.2% | 24.8% | 62.3% | 12.2% |
| 50CC | 50.1% | 30.9% | 67.9% | 14.1% |
| 40CC | 55.5% | 38.1% | 71.7% | 16.6% |
| 30CC | 62.0% | 57.4% | 75.5% | 19.2% |
| 20CC | 69.8% | 58.8% | 80.0% | 22.6% |
| 15CC est | | | | 24.5% |
| 10CC | 75.2% | 72.9% | 85.1% | 26.5% |
| 05CC | 84.1% | 80.3% | 87.6% | 28.5% |
| CYAN | | | | |
| 130CC est | 29.2% | 48.0% | 11.3% | 9.7% |
| 120CC est | 32.9% | 52.2% | 14.4% | 11.3% |
| 110CC | 36.6% | 56.4% | 17.5% | 12.8% |
| 100CC | 40.3% | 60.6% | 20.6% | 14.3% |

CHART 2-continued

| | T % Total | T % 400–550 | T % 550–750 | Efficacy 400–700 |
|---|---|---|---|---|
| 90CC | 44.1% | 64.8% | 23.9% | 15.7% |
| 80CC | 46.2% | 66.1% | 27.0% | 16.6% |
| 70CC | 48.4% | 67.3% | 30.0% | 17.5% |
| 60CC | 55.1% | 73.8% | 36.9% | 19.8% |
| 50CC | 63.1% | 81.9% | 45.0% | 22.7% |
| 45CC est | | | | 23.3% |
| 40CC | 67.0% | 83.1% | 51.3% | 24.0% |
| 30CC | 71.4% | 84.8% | 58.4% | 25.5% |
| 25CC est | 73.8% | 85.4% | 62.3% | 26.3% |
| 20CC | 76.2% | 86.0% | 66.2% | 27.0% |
| 10CC | 85.3% | 88.3% | 78.5% | 29.2% |
| 05CC | 87.0% | 89.2% | 84.9% | 30.3% |

CHART 3

| 1 | 2 | 3 | 4 | 5 | 6 | 7 | 8 | 9 | 10 | 11 | 12 | 13 | |
|---|---|---|---|---|---|---|---|---|---|---|---|---|---|
| Location (from top) | | | LENS 1 | T % | T % | T % | Efficacy | LENS 2 | T % | T % | T % | Efficacy | Total |
| % | mm | inch | CC | Total | 400–550 | 550–750 | 400–700 | CC | Total | 400–550 | 550–750 | 400–700 | Tv |
| 3% | 1 | 0.04 | M-70CC | 47.6% | 39.3% | 53.4% | 9.1% | G-112CC | 30.6% | 20.1% | 16.8% | 10.5% | 19.6% |
| 6% | 2 | 0.08 | M-65CC | 51.0% | 43.8% | 56.0% | 10.6% | G-111CC | 33.5% | 20.7% | 17.3% | 10.8% | 21.4% |

CHART 3-continued

| 1 | 2 | 3 | 4 | 5 | 6 | 7 | 8 | 9 | 10 | 11 | 12 | 13 | |
|---|---|---|---|---|---|---|---|---|----|----|----|----|---|
| Location (from top) | | | LENS 1 | T % | T % | T % | Efficacy | LENS 2 | T % | T % | T % | Efficacy | Total |
| % | mm | inch | CC | Total | 400–550 | 550–750 | 400–700 | CC | Total | 400–550 | 550–750 | 400–700 | Tv |
| 9% | 3 | 0.12 | M-60CC | 54.5% | 48.3% | 58.5% | 12.1% | G-110CC | 18.9% | 21.3% | 17.9% | 11.1% | 23.3% |
| 12% | 4 | 0.16 | M-58CC | 56.7% | 50.7% | 58.5% | 12.8% | G-105CC | 20.9% | 23.2% | 20.0% | 12.1% | 24.8% |
| 15% | 5 | 0.20 | M-56CC | 59.0% | 53.1% | 60.6% | 13.4% | G-100CC | 22.8% | 25.2% | 22.1% | 13.0% | 26.4% |
| 18% | 6 | 0.24 | M-54CC | 61.3% | 55.5% | 62.7% | 14.0% | G-97CC | 23.8% | 25.9% | 22.8% | 13.3% | 27.3% |
| 21% | 7 | 0.28 | M-52CC | 63.6% | 58.0% | 64.8% | 14.7% | G-95CC | 24.8% | 26.7% | 23.6% | 13.6% | 28.3% |
| 24% | 8 | 0.31 | M-50CC | 65.9% | 60.4% | 69.0% | 15.3% | G-92CC | 25.8% | 27.4% | 24.4% | 13.9% | 29.2% |
| 26% | 9 | 0.35 | M-49CC | 66.2% | 60.8% | 69.3% | 15.5% | G-90CC | 26.8% | 28.2% | 25.1% | 14.1% | 29.7% |
| 29% | 10 | 0.39 | M-48CC | 66.6% | 61.2% | 69.7% | 15.8% | G-88CC | 27.7% | 28.9% | 25.9% | 14.4% | 30.2% |
| 32% | 11 | 0.43 | M-47CC | 66.9% | 61.6% | 70.0% | 16.0% | G-86CC | 28.7% | 29.7% | 26.7% | 14.7% | 30.7% |
| 35% | 12 | 0.47 | M-46CC | 67.2% | 61.9% | 70.3% | 16.2% | G-83CC | 29.7% | 30.4% | 27.4% | 15.0% | 31.2% |
| 38% | 13 | 0.51 | M-45CC | 67.6% | 62.3% | 70.6% | 16.4% | G-81CC | 30.7% | 31.2% | 28.2% | 15.3% | 31.7% |
| 41% | 14 | 0.55 | M-44CC | 67.9% | 62.7% | 70.9% | 16.6% | G-79CC | 31.7% | 31.9% | 29.0% | 15.6% | 32.1% |
| 44% | 15 | 0.59 | M-43CC | 68.2% | 63.1% | 71.2% | 16.8% | G-76CC | 32.6% | 32.7% | 29.7% | 15.8% | 32.6% |
| 47% | 16 | 0.63 | M-42CC | 68.6% | 63.5% | 71.5% | 17.0% | G-74CC | 33.6% | 33.4% | 30.5% | 16.1% | 33.1% |
| 50% | 17 | 0.67 | M-41CC | 68.9% | 63.9% | 71.9% | 17.2% | G-72CC | 34.6% | 34.2% | 31.3% | 16.4% | 33.6% |
| 53% | 18 | 0.71 | M-40CC | 69.3% | 64.3% | 72.2% | 17.4% | G-70CC | 32.8% | 35.0% | 32.1% | 16.7% | 34.1% |
| 56% | 19 | 0.75 | M-35CC | 71.5% | 67.0% | 74.2% | 18.8% | G-60CC | 39.4% | 41.4% | 39.0% | 19.0% | 37.8% |
| 59% | 20 | 0.79 | M-30CC | 73.8% | 69.7% | 76.2% | 20.2% | G-55CC | 42.9% | 45.6% | 41.6% | 20.1% | 40.3% |
| 62% | 21 | 0.83 | G-55CC | 42.9% | 45.6% | 41.6% | 20.1% | M-30CC | 73.8% | 69.7% | 76.2% | 20.2% | 40.3% |
| 65% | 22 | 0.87 | G-50CC | 46.3% | 49.9% | 44.1% | 21.1% | M-28CC | 75.0% | 71.2% | 76.6% | 20.8% | 41.9% |
| 68% | 23 | 0.91 | G-45CC | 49.2% | 52.3% | 47.6% | 22.0% | M-25CC | 76.2% | 72.7% | 77.0% | 21.4% | 43.4% |
| 71% | 24 | 0.94 | G-40CC | 52.2% | 54.6% | 51.1% | 22.8% | M-23CC | 77.4% | 74.2% | 77.4% | 22.0% | 44.8% |
| 74% | 25 | 0.98 | G-35CC | 55.6% | 58.2% | 59.0% | 23.6% | M-20CC | 78.6% | 75.7% | 80.2% | 23.2% | 46.8% |
| 76% | 26 | 1.02 | G-30CC | 59.1% | 61.8% | 67.0% | 24.4% | M-17CC | 80.4% | 77.8% | 81.5% | 24.4% | 48.9% |
| 79% | 27 | 1.06 | G-25CC | 63.3% | 65.4% | 67.0% | 25.5% | M-13CC | 82.2% | 79.9% | 82.8% | 25.7% | 51.2% |
| 82% | 28 | 1.10 | G-20CC | 67.6% | 69.1% | 67.0% | 26.6% | M-10CC | 84.1% | 82.1% | 85.4% | 26.9% | 53.5% |
| 85% | 29 | 1.14 | G-10CC | 78.3% | 79.2% | 77.9% | 28.8% | M-05CC | 87.3% | 86.0% | 88.2% | 29.1% | 57.8% |
| 88% | 30 | 1.18 | G-10CC | 78.3% | 79.2% | 77.9% | 28.8% | M-05CC | 87.3% | 86.0% | 88.2% | 29.1% | 57.8% |
| 91% | 31 | 1.22 | G-10CC | 78.3% | 79.2% | 77.9% | 28.8% | M-05CC | 87.3% | 86.0% | 88.2% | 29.1% | 57.8% |
| 94% | 32 | 1.26 | G-05CC | 88.9% | 89.6% | 89.0% | 31.6% | M-02CC | 93.7% | 93.0% | 94.1% | 31.8% | 63.4% |
| 97% | 33 | 1.30 | G-00CC | 100.0% | 100.0% | 100.0% | 34.4% | M-00CC | 100.0% | 100.0% | 100.0% | 34.4% | 68.8% |
| 100% | 34 | 1.34 | G-0CC | 100.0% | 100.0% | 100.0% | 34.4% | M-0CC | 100.0% | 100.0% | 100.0% | 34.4% | 68.8% |
| | | | | | 63.4% | 67.9% | | | | 51.4% | 50.8% | | |

Revised Feb 12, 2003

CHART 4

| | T % Total | T % 400–550 | T % 550–750 | Efficacy 400–700 |
|---|---|---|---|---|
| Magenta | | | | |
| 110CC | 22.9% | 19.24 | 26.41 | 3.7% |
| 100CC | 35.3% | 28.79 | 39.92 | 6.1% |
| 90CC | 47.6% | 39.34 | 53.43 | 8.5% |
| 80CC | 45.7% | 38.61 | 50.71 | 8.8% |
| 70CC | 43.9% | 37.88 | 47.98 | 9.1% |
| 60CC | 54.5% | 48.28 | 58.51 | 12.1% |
| 50CC | 65.9% | 60.39 | 69.02 | 15.3% |
| 40CC | 69.3% | 64.26 | 72.18 | 17.4% |
| 30CC | 73.8% | 69.74 | 76.17 | 20.2% |
| 20CC | 78.6% | 75.68 | 80.18 | 23.2% |
| 10CC | 84.1% | 82.11 | 85.36 | 26.9% |
| 05CC | 87.3% | 85.96 | 88.21 | 29.1% |

CHART 4-continued

| | T % Total | T % 400–550 | T % 550–750 | Efficacy 400–700 |
|---|---|---|---|---|
| Green | | | | |
| 110CC | 18.9% | 21.32 | 17.91 | 11.1% |
| 100CC | 22.8% | 25.15 | 22.05 | 13.0% |
| 90CC | 26.8% | 28.99 | 26.19 | 14.8% |
| 80CC | 29.8% | 31.99 | 29.13 | 15.7% |
| 70CC | 32.8% | 34.98 | 32.07 | 16.7% |
| 60CC | 39.4% | 41.35 | 39.04 | 19.0% |
| 50CC | 46.3% | 49.93 | 44.13 | 21.1% |
| 40CC | 52.2% | 54.62 | 51.09 | 22.8% |
| 30CC | 59.1% | 61.76 | 66.96 | 24.4% |
| 20CC | 67.6% | 69.1 | 66.96 | 26.6% |
| 10CC | 78.3% | 79.21 | 77.88 | 28.8% |
| 05CC | 84.0% | 84.21 | 84.04 | 29.9% |

CHART 5

| 1 | 2 | 3 | 4 | 5 | 6 | 7 | 8 | 9 | 10 | 11 | 12 | 13 |
|---|---|---|---|---|---|---|---|---|----|----|----|----|
| Location (from top) | | | LENS 1 | T % | T % | T % | Efficacy | LENS 2 | T % | T % | T % | Efficacy |
| % | mm | inch | CC | Total | 400–550 | 550–750 | 400–700 | CC | Total | 400–550 | 550–750 | 400–700 |
| 3% | 1 | 0.04 | 10CC-B | 78.4% | 82.4% | 74.2% | 26.0% | 110CC-Y | 60.1% | 31.6% | 90.3% | 28.4% |
| 6% | 2 | 0.08 | 10CC-B | 78.7% | 82.5% | 74.6% | 26.1% | 109CC-Y | 60.2% | 31.8% | 90.3% | 28.4% |

CHART 5-continued

| 1 | 2 | 3 | 4 | 5 | 6 | 7 | 8 | 9 | 10 | 11 | 12 | 13 |
|---|---|---|---|---|---|---|---|---|---|---|---|---|
| | Location (from top) | | LENS 1 | T % | T % | T % | Efficacy | LENS 2 | T % | T % | T % | Efficacy |
| % | mm | inch | CC | Total | 400–550 | 550–750 | 400–700 | CC | Total | 400–550 | 550–750 | 400–700 |
| 9% | 3 | 0.12 | 09CC-B | 79.0% | 82.7% | 75.0% | 26.2% | 108CC-Y | 60.3% | 32.1% | 90.2% | 28.4% |
| 12% | 4 | 0.16 | 09CC-B | 79.3% | 82.9% | 75.5% | 26.4% | 107CC-Y | 60.3% | 32.3% | 90.2% | 28.4% |
| 15% | 5 | 0.20 | 09CC-B | 79.7% | 83.1% | 75.9% | 26.5% | 106CC-Y | 60.4% | 32.5% | 90.1% | 28.4% |
| 18% | 6 | 0.24 | 09CC-B | 80.0% | 83.3% | 76.3% | 26.6% | 105CC-Y | 60.5% | 32.7% | 90.0% | 28.4% |
| 21% | 7 | 0.28 | 08CC-B | 80.3% | 83.5% | 76.8% | 26.8% | 104CC-Y | 60.6% | 32.9% | 90.0% | 28.4% |
| 24% | 8 | 0.31 | 08CC-B | 80.6% | 83.7% | 77.2% | 26.9% | 103CC-Y | 60.6% | 33.1% | 89.9% | 28.4% |
| 26% | 9 | 0.35 | 08CC-B | 80.9% | 83.8% | 77.6% | 27.0% | 102CC-Y | 60.7% | 33.3% | 89.9% | 28.4% |
| 29% | 10 | 0.39 | 08CC-B | 81.2% | 84.0% | 78.1% | 27.2% | 101CC-Y | 60.8% | 33.6% | 89.8% | 28.4% |
| 32% | 11 | 0.43 | 07CC-B | 81.5% | 84.2% | 78.5% | 27.3% | 100CC-Y | 60.9% | 33.8% | 89.7% | 28.5% |
| 35% | 12 | 0.47 | 07CC-B | 81.8% | 84.4% | 79.0% | 27.4% | 98CC-Y | 60.9% | 34.0% | 89.7% | 28.5% |
| 38% | 13 | 0.51 | 07CC-B | 82.1% | 84.6% | 79.4% | 27.6% | 97CC-Y | 61.0% | 34.2% | 89.6% | 28.5% |
| 41% | 14 | 0.55 | 07CC-B | 82.4% | 84.8% | 79.8% | 27.7% | 96CC-Y | 61.1% | 34.4% | 89.6% | 28.5% |
| 44% | 15 | 0.59 | 06CC-B | 82.7% | 85.0% | 80.3% | 27.8% | 95CC-Y | 61.2% | 34.6% | 89.5% | 28.5% |
| 47% | 16 | 0.63 | 06CC-B | 83.0% | 85.1% | 80.7% | 28.0% | 94CC-Y | 61.2% | 34.9% | 89.4% | 28.5% |
| 50% | 17 | 0.67 | 06CC-B | 83.3% | 85.3% | 81.1% | 28.1% | 93CC-Y | 61.3% | 35.1% | 89.4% | 28.5% |
| 53% | 18 | 0.71 | 06CC-B | 83.6% | 85.5% | 81.6% | 28.2% | 92CC-Y | 61.4% | 35.3% | 89.3% | 28.5% |
| 56% | 19 | 0.75 | 05CC-B | 83.9% | 85.7% | 82.0% | 28.4% | 91CC-Y | 61.5% | 35.5% | 89.3% | 28.5% |
| 59% | 20 | 0.79 | 05CC-B | 84.3% | 85.9% | 82.4% | 28.5% | 90CC-Y | 61.6% | 35.7% | 89.2% | 28.5% |
| 62% | 21 | 0.83 | 90CC-Y | 61.6% | 35.7% | 89.2% | 28.5% | 05CC-B | 84.3% | 85.9% | 82.4% | 28.5% |
| 65% | 22 | 0.87 | 81CC-Y | 64.1% | 40.6% | 89.4% | 28.8% | 05CC-B | 85.2% | 86.6% | 83.3% | 28.8% |
| 68% | 23 | 0.91 | 72CC-Y | 66.7% | 45.4% | 89.6% | 29.0% | 05CC-B | 86.2% | 87.3% | 84.2% | 29.0% |
| 71% | 24 | 0.94 | 63CC-Y | 69.3% | 50.2% | 89.7% | 29.3% | 05CC-B | 87.2% | 88.0% | 85.1% | 29.3% |
| 74% | 25 | 0.98 | 54CC-Y | 71.9% | 55.1% | 89.9% | 29.5% | 05CC-B | 88.2% | 88.7% | 85.9% | 29.5% |
| 76% | 26 | 1.02 | 45CC-Y | 74.5% | 59.9% | 90.1% | 29.8% | 04CC-B | 89.1% | 89.4% | 86.8% | 29.8% |
| 79% | 27 | 1.06 | 36CC-Y | 77.1% | 64.7% | 90.3% | 30.0% | 04CC-B | 90.1% | 90.1% | 87.7% | 30.0% |
| 82% | 28 | 1.10 | 27CC-Y | 79.7% | 69.6% | 90.5% | 30.3% | 04CC-B | 91.1% | 90.8% | 88.6% | 30.3% |
| 85% | 29 | 1.14 | 18CC-Y | 82.3% | 74.4% | 90.6% | 30.5% | 04CC-B | 92.1% | 91.5% | 89.5% | 30.5% |
| 88% | 30 | 1.18 | 09CC-Y | 84.8% | 79.2% | 90.8% | 30.8% | 04CC-B | 93.0% | 92.2% | 90.3% | 30.8% |
| 91% | 31 | 1.22 | 05CC-Y | 87.4% | 84.1% | 91.0% | 31.0% | 03CC-B | 94.0% | 93.0% | 91.2% | 31.0% |
| 94% | 32 | 1.26 | 03CC-Y | 91.6% | 89.4% | 94.0% | 32.1% | 02CC-B | 96.0% | 95.3% | 94.1% | 32.1% |
| 97% | 33 | 1.30 | 02CC-Y | 95.8% | 94.7% | 97.0% | 33.3% | 01CC-B | 98.0% | 97.7% | 97.1% | 33.3% |
| 100% | 34 | 1.34 | 00CC-Y | 100.0% | 100.0% | 100.0% | 34.4% | 00CC-B | 100.0% | 100.0% | 100.0% | 34.4% |
| | | | | | 77.2% | 83.8% | | | | | 57.4% | 89.5% |

Revised Feb 12, 2003

CHART 6

| | T %<br>Total | T %<br>400–550 | T %<br>550–750 | Efficacy<br>400–700 |
|---|---|---|---|---|
| Blue | | | | |
| 50CC | 46.6% | 59.9% | 32.2% | 12.2% |
| 40CC | 52.2% | 64.4% | 39.1% | 14.6% |
| 30CC | 60.1% | 69.7% | 49.7% | 17.8% |
| 20CC | 68.1% | 75.1% | 60.4% | 21.4% |
| 10CC | 78.4% | 82.4% | 74.2% | 26.0% |
| 05CC | 84.3% | 85.9% | 82.4% | 28.5% |
| 03CC | 94.0% | 92.9% | 91.2% | 31.5% |
| 00CC | 100.0% | 100.0% | 100.0% | 34.4% |
| Yellow | | | | |
| 110CC | 60.1% | 31.62 | 90.3% | 28.4% |
| 90CC | 61.6% | 35.72 | 89.2% | 28.5% |
| 70CC | 65.4% | 42.79 | 89.6% | 29.3% |
| 50CC | 71.1% | 53.01 | 90.32 | 29.5% |
| 40CC | 74.0% | 58.51 | 90.38 | 29.8% |
| 30CC | 77.0% | 64.08 | 90.61 | 30.1% |
| 20CC | 80.6% | 71.11 | 90.7% | 30.5% |
| 10CC | 85.4% | 80.24 | 90.9 | 30.9% |
| 05CC | 87.4% | 84.05 | 90.99 | 31.0% |

DETAILED DESCRIPTION OF THE PREFERRED EMBODIMENTS

Although specific embodiments of the present invention will now be described with reference to the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

First, the principles upon which the present invention is based will be discussed.

The eye interprets color through the cones in the retina, which has nothing to do with visual acuity (or the ability for the eye to focus objects sharply). Then, via the optic nerve, color light is transferred to the Lateral Geniculate Body (LGB). The LGB is the "visual middleman". It receives information from the eyes via the optic nerve, does preliminary analysis of the information and then sends it to the visual cortex. The visual cortex is the part of the cerebral cortex that processes visual information. The visual cortex is where we actually see the images in front of our eyes. It is here where the brain interprets color as received from the cones in the retina. For example, if both eyes see a red object, the visual cortex tells us that the object is red, provided the viewer is not wearing mono-colored lenses over the eyes which contaminates the true color of the object. A major problem with most if not all sunglasses arises because of problems with tint in mono-colored and coated lenses. As a result, visual alignment of lenses and manufacturing processes require 100% perfect quality control.

It is the theory of the present invention that by wearing complementary lenses (a primary colored lens—PCL over a portion of the lens over one eye and a secondary colored lens—SCL over an aligned portion of the lens over the other eye of no more than twelve percent difference in efficacy, the visual cortex will perceive the red object as true red. Example: the viewer will wear a red lens over one eye and a cyan lens over the other eye within twelve percent efficacy, wear a blue lens over one eye and a yellow lens over the other eye of no more than twelve percent difference in efficacy, wear a green lens over one eye and a magenta lens over the other eye within twelve percent efficacy.

When the visual cortex views color through complementary lenses, it neutralizes the filtering, rendering the object or objects in true color even when viewing red and cyan objects in the same field of vision. Except for the darkened effect of the combined neutral density which is provided with complementary lenses, there is no sacrifice of color as in tinted mono-colored or coated lenses. Contaminated color is a major problem with all other sunglasses. However, if the wearer is suffering from cataracts, color blindness, loss of one eye or damage to the cones, optic nerve or visual cortex, the complementary lens will not work. For all other wearers, no matter how bad their visual acuity may be, the complementary lenses will work, which makes up approximately eighty-five percent (85%) of sunglass wearers.

Complementary lenses work with both ultraviolet filters and polarizing lenses filters without sacrificing true color and also with corrective lenses without sacrificing true color.

In general, sunglasses have a density effect which is necessary in order to provide proper shading from the sun because non-density sunglasses would not provide the proper shading. However, when the wearer views objects through sunglasses, density tints the color that the wearer sees and in fact, the objects appear color contaminated. The present invention seeks to remedy this problem by providing sufficient shading to the eyes but at the same time eliminating the color contaminated effects of tinted sunglasses, so what the person sees is true neutral color.

The present invention accomplishes this by having two different dual complementary colored lenses embedded in each of the respective lenses, which dual complementary colors are aligned with each other in each of the respective lenses, in front of each respective eye so that the colors in fact provide the necessary shading and screening, but at the same time provide true neutral color instead of the contaminated color. Specifically, the sunglasses may incorporate polarizing and/or UV lenses or may also incorporate corrective lenses, so that the eyes are protected from ultraviolet light and the image is polarized, or the vision is corrected while at the same time providing the beneficial effects of the present invention. However, if lenses are clear, then of course the shading effect of the sunglasses will not take place. The innovative feature of the present invention is to match two complementary colors which because of an optical principle involving the effect that they have on the brain as discussed above, causes the brain to view the colors through the colored set of complementary colored lenses as true neutral color. The specific dual complementary colors that are used for the first set are green and magenta for one lens and inversely magenta and green for the other lens. A second set of dual complementary colors that are used, cyan and red for one lens and inversely, red and cyan for the other lens. A third set of dual complementary colors that are used are blue and yellow for one lens and inversely, yellow and blue for the other lens. The idea is that you would have sunglasses having a dual complementary color lens with a primary and secondary color combination mentioned above on one lens and the other lens containing the dual complementary color lens with the same primary and secondary colors (only inverse), i.e. green/magenta and magenta/green; red/cyan and cyan/red; and blue/yellow and yellow/blue; and by having these different colors on the lenses, the light that a person sees through the lens is in fact true color instead of being contaminated, but at the same time provides a shading effect.

It is intended that these colors will be represented by dyes which will be embedded in each respective lens and that the dyes will be in gradients as discussed above having more dye for a darker band on the uppermost bands of the lens and lesser dyes with the lesser color density as the bands decrease toward the bottom of the lens. In addition to having the true color, it is also an attractive visual appearance which people will find to be appealing and novel and will wish to purchase.

Referring to FIG. 1, there is shown an illustrative view of a pair of lenses, each having gradient bands of colors. Lens 1 is worn in front of the right eye and lens 2 is worn in front of the left eye although it will be appreciated that the discussion below is also applicable if lens 1 is worn in front of the left eye and lens 2 is worn in front of the right eye. It will further be appreciated that lens 1 and lens 2 are retained in the frame so as to function as the lenses of a pair of sunglasses.

Chart 1 discusses the primary and secondary colors incorporated into one set of sunglasses utilizing lens 1 and lens 2 illustrated in FIG. 1. In Chart 1, R stands for the color red and C stands for the color cyan. In the preferred embodiment, lens 1 and lens 2 are each formed into thirty-four (34) bands each having a height "H" of approximately one (1) millimeter (mm). The first column in Chart 1 shows the approximate percent the given band occupies relative to the entire height of the lens 1 and also for lens 2. The second column of Chart 1 shows the location in millimeters that the lowermost portion of a band occupies relative to the top of the lens and the third column shows the same location in inches. In lens 1, the top nineteen (19) bands are formed with the color red which has a given percentage of visible transmitted light depending oh the amount of color correction (cc) units incorporated into the given band of red. In Chart 2 the left column sets forth the total percentage transmission of red for a given amount of color correction units and the total percentage of transmitted light in the wavelength range of 400–550 nm and 550–750 nm for the corresponding amount of cc of red. In lens 1 the lower fifteen (15) bands are formed with the color cyan which also has a given percentage of visible transmitted light depending on the amount of cc units incorporated into the given band of cyan. In Chart 2 the right column sets forth the total percentage transmission of cyan for a given amount of color correction units and the total percentage of transmitted light in the wavelength range of 400–550 nm and 550–750 nm for the corresponding amount of cc of cyan. For purposes of this discussion, red is considered the primary color and cyan is considered the complementary secondary color.

In lens 2 set forth in Chart 1, the top nineteen (19) bands are formed with the complementary secondary color cyan which has a given percentage of visible transmitted light depending on the amount of color correction units incorporated into the given band of cyan as set forth in Chart 2. In lens 2 the lower fifteen (15) bands are formed with the color red which also has a given percentage of visible transmitted light depending on the amount of cc units incorporated into the given band of red as set forth in Chart 2.

The amount of color correction units incorporated into each band is computed to achieve the following results:

(1) First, based upon the transmittance of each color in wavelengths 400–550 nm and 550–750 nm, the bands of each color are selected with a given amount of color correction units so that the total amount of light transmitted in wavelength range 400–550 nm is greater than fifty percent (50%) and the total amount of light transmitted in wavelength range 550–750 nm is greater than fifty percent (50%) for lens 1 and also for lens 2. The amount of light transmitted in lens 1 for the wavelength range 400–550 nm is computed from column 6 of Chart 1 where the percentage transmittance for each of the thirty-four bands is added and the total divided by 34. Similarly, the amount of light transmitted in lens 1 for the wavelength range 550–750 nm is computed from Column 7 of Chart 1 where the percentage transmitted for each of the thirty-four bands is added and the total divided by 34. As shown in Chart 1, the total average percentage of light transmitted in the wavelength range 400–550 nm is 56% and the total average percentage of light transmitted in the wavelength range 550–750 nm is 66.4%. The amount of light transmitted in lens 2 for the wavelength range 400–550 nm is computed from column 11 of Chart 1 where the percentage transmitted for each of the thirty-four bands is added and the total divided by 34. Similarly, the, amount of light transmitted in lens 2 for the wavelength range 550–750 nm is computed from Column 12 of Chart 1 where the percentage transmitted for each of the thirty-four bands is added and the total divided by 34. As shown in Chart 1, the total average percentage of light transmitted in the wavelength range 400–550 nm is 66.7% and the total average percentage of light transmitted in the wavelength range 550–750 nm is 50.4%.

(2) Second, in order to reduce retinal rivalry, the amount of efficacy in aligned bands of the primary color in lens 1 and the complementary secondary color in lens 2 for the top 19 bands must be within twelve percent (12%) and the amount of efficacy in aligned bands of the secondary color in lens 1 and the complementary primary color in lens 2 for the lower fifteen (15) bands must be within twelve percent (12%). Efficacy is what the eye actually processes from the available light. The cc color density determines the efficacy of what total light the wearer actually processes. Referring to Chart 2, the efficacy of the color red for a given amount of color correction units is shown on the last column on the left side of the chart and the efficacy of the color cyan for a given amount of color correction units is shown on the last column of the right side of the chart. Based upon Chart 2, the amount of efficacy of each color in lens 1 for each band is set forth in column 8 and the amount of efficacy of each color in lens 2 for each band is set forth in column 13 in Chart 1. A comparison of each aligned band from lens 1 and lens 2 in chart 1 shows that their respective efficacies are within twelve percent (12%) of each other.

(3) Third, to achieve greater apparent brightness, the color density at the upper portion of each lens is greatest and with the color density gradually decreasing as the bands go toward the bottom of the lens. For lens 1, referring to column 4 of Chart 1, it is seen that the greatest color density is in the first band and each successive lower band has less color correction units. This pattern continues even after band 19 where the color changes from red to cyan. For lens 2, referring to column 9 of Chart 1, it is seen that the greatest color density is in the first band, and each successive lower band has less color correction units. This pattern continues even after band 19 where the color changes from cyan to red.

(4) Fourth, the bands of lens 1 and lens 2 are arranged so that for each band in lens 1 of a primary color, the aligned band in lens 2 is of the complementary secondary color and for each band in lens 2 of a secondary color, the aligned band in lens 2 is of the complementary primary color. With R standing for red and C standing for cyan, it is seen that each red band in lens 1 is aligned with a cyan band in lens 2 and each cyan band in lens 1 is aligned with a red band in lens 2.

Each lens is created by dipping the lens in a coloring solution to a given depth and after the amount of cc's in that color has been impregnated into the lens, raising the lens so that the next band has more color density, etc. until the highest color density is achieved at the uppermost band.

It will further be appreciated that when the final lens is viewed, the colors appear as gradients going from red darkest at the top to red lightest at band 19 and then cyan darkest at band 20 to cyan lightest at band 34 for lens 1 and cyan darkest at the top to cyan lightest 19 and the red darkest at band 20 to red lightest at band 34 for lens 2.

Chart 3 discusses the primary and secondary colors incorporated into a second set of sunglasses utilizing lenses 1 and 2 illustrated in FIG. 1. In Chart 3, the M stands for the color magenta and G stands for the color green. In the preferred embodiment, lens 1 and lens 2 are each formed into thirty-four (34) bands each having a height "H" of approximately one (1) millimeter (mm). The first column in Chart 3 shows the approximate percent a given band occupies relative to the entire height of the lens 1 and also for lens 2. The second column of Chart 3 shows the location in millimeters that the lowermost portion of a band occupies relative to the top of the lens and the third column shows the same location in inches. In lens 1, the top twenty (20) bands are formed with the color magenta which has a given percentage of visible transmitted light depending on the amount of color correction (cc) units incorporated into the given band of magenta. In Chart 4 the left column sets forth the total percentage transmission of magenta for a given amount of color correction units and the total percentage of transmitted light in the wavelength range of 400–550 nm and 550–750 nm for the corresponding amount of cc of magenta. In lens 1 the lower fourteen (14) bands are formed with the color green which also has a given percentage of visible transmitted light depending on the amount of cc units incorporated into the given band of green. In Chart 4 the right column sets forth the total percentage transmittance of green for a given amount of color correction units and the total percentage of transmitted light in the wavelength range of 400–550 nm and 550–750 nm for the corresponding amount of cc of green. For purposes of this discussion, magenta is considered the secondary color and green is considered the complementary primary color.

In lens 2 set forth in Chart 3, the top twenty (20) bands are formed with the complementary primary color green which has a given percentage of visible transmitted light depending on the amount of color correction units incorporated into the given band of green as set forth in Chart 4. In lens 2 the lower fourteen (14) bands are formed with the color magenta which also has a given percentage of visible transmitted light depending on the amount of cc units incorporated into the given band of magenta as set forth in Chart 4.

The amount of color correction units incorporated into each band is computed to achieve the following results: (1) First, based upon the transmittance of each color in wavelengths 400–550 nm and 550–750 nm, the bands of each color are selected with a given amount of color correction units so that the total amount of light transmitted in wavelength range of 400–550 nm is greater than fifty percent (50%) and the total amount of light transmitted in wavelength range 550–750 nm is greater than fifty percent (50%) for lens 1 and also for lens 2. The amount of light transmitted in lens 1 for the wavelength range 400–550 nm is computed from column 6 of Chart 3 where the percentage transmittance for each of the thirty-four bands is added and the total divided by 34. Similarly, the amount of light transmitted in lens 1 for the wavelength range 550–750 nm is computed from column 7 of Chart 3 where the percentage transmitted for each of the thirty-four bands is added and the total divided by 34. As shown in Chart 3, the total average percentage of light transmitted in the wavelength range 400–550 nm is 63.45% and the total average percentage of light transmitted in the wavelength range 550–750 is 67.9%. The amount of light transmitted in lens 2 for the wavelength range 400–550 nm is computed from column 11 of Chart 3 where the percentage transmitted for each of the thirty-four bands is added and the total divided by 34. Similarly, the amount of light transmitted in lens 2 for the wavelength range 550–750 nm is computed from Column 12 of Chart 3 where the percentage transmitted for each of the thirty-four bands is added and the total divided by 34. As shown in Chart 3, the total average percentage of light transmitted in the wavelength range 400–550 nm is 51.4% and the total average percentage of light transmitted in the wavelength range 550–750 nm is 50.8%.

(2) Second, in order to reduce retinal rivalry, the amount of efficacy in aligned bands of the primary color in lens 1 and the complementary secondary color in lens 2 for the top twenty (20) bands must be within twelve percent (12%) and the amount of efficacy in aligned bands of the secondary color in lens 1 and the complementary primary color in lens 2 for the lower fourteen (14) bands must be within twelve percent (12%). Efficacy is what the eye actually processes from the available light. The cc color density determines the efficacy of what total light the wearer actually processes. Referring to Chart 4, the efficacy of the color magenta for a given amount of color correction units is shown on the last column on the left side of the chart and the efficacy of the color green for a given amount of color correction units is shown on the last column of the right side of the chart. Based upon Chart 4, the amount of efficacy of each color in lens 1 for each band is set forth in column 8 and the amount of efficacy of each color in lens 2 for each band is set forth in column 13 in Chart 3. A comparison of each aligned band from lens 1 and lens 2 in Chart 3 shows that their respective efficacies are within twelve percent (12%) of each other.

(3) Third, to achieve greater apparent brightness, the color density at the upper portion of each lens is greatest and with the color density gradually decreasing as the bands go toward the bottom of the lens. For lens 1, referring to column 4 of Chart 3, it is seen that the greatest color density is in the first band, and each successive lower band has less color correction units. This pattern continues even after band 20 where the color changes from magenta to green. For lens 2, referring to column 9 of Chart 3, it is seen that the greatest color density is in the first band, and each successive lower band has less color correction units. This pattern continues even after band 20 where the color changes from green to magenta.

(4) Fourth, the bands of lens 1 and lens 2 are arranged so that for each band in lens 1 of a primary color, the aligned band in lens 2 is of the complementary secondary color and for each band in lens 2 of a secondary color, the aligned band in lens 1 is of the complementary primary color. With M standing for magenta and G standing for green, it is seen that each magenta band in lens 1 is aligned with a green band in lens 2 and each green band in lens 1 is aligned with a magenta band in lens 2.

Each lens is created by dipping the lengths in a coloring solution to a given depth and after the amount of cc's in that color has been impregnated into the lens, raising the lens so that the next band has more color density etc., until the highest color density is achieved at the uppermost band.

It will further be appreciated that when the final lens is viewed, the colors appear as gradients going from magenta darkest at the top to magenta lightest at band 20 and then green darkest at band 21 to green lightest at band 34 in lens 1 and green darkest at the top to green lightest at band 20 and then magenta darkest at band 21 to magenta lightest at band 34 for lens 2.

Chart 5 discusses the primary and secondary colors incorporated into a third set of sunglasses utilizing lenses 1 and 2 illustrated in FIG. 1. In Chart 5, the B stands for the color blue and Y stands for the color yellow. In the preferred embodiment, lens 1 and lens 2 are each formed into thirty-four (34) bands each having a height "H" of approximately one (1) millimeter (mm). The first column in Chart 5 shows the approximate percent a given band occupies relative to the entire height of the lens 1 and also for lens 2. The second column of Chart 5 shows the location in millimeters that the lowermost portion of a band occupies relative to the top of the lens and the third column shows the same location in inches. In lens 1, the top twenty (20) bands are formed with the color blue which has a given percentage of visible transmitted light depending on the amount of color correction (cc) units incorporated into the given band of blue. In Chart 6 the left column sets forth the total percentage transmission of blue for a given amount of color correction units and the total percentage of transmitted light in the wavelength range of 400–550 nm and 550–750 nm for the corresponding amount of cc of blue. In lens 1 the lower fourteen (14) bands are formed with the color yellow which also has a given percentage of visible transmitted light depending on the amount of cc units incorporated into the given band of yellow. In Chart 6 the right column sets forth the total percentage transmittance of yellow for a given amount of color correction units and the total percentage of transmitted light in the wavelength range of 400–550 nm and 550–750 nm for the corresponding amount of cc of yellow. For purposes of this discussion, blue is considered the primary color and yellow is considered the complementary secondary color.

In lens 2 set forth in Chart 5, the top twenty (20) bands are formed with the complementary primary color yellow which has a given percentage of visible transmitted light depending on the amount of color correction units incorporated into the given band of yellow as set forth in Chart 6. In lens 2 the lower fourteen (14) bands are formed with the color blue which also has a given percentage of visible transmitted light depending on the amount of cc units incorporated into the given band of blue as set forth in Chart 6.

The amount of color correction units incorporated into each band is computed to achieve the following results: (1) First, based upon the transmittance of each color in wavelengths 400–550 nm and 550–750 nm, the bands of each color are selected with a given amount of color correction units so that the total amount of light transmitted in wavelength range of 400–550 nm is greater than fifty percent (50%) and the total amount of light transmitted in wavelength range 550–750 nm is greater than fifty percent (50%) for lens 1 and also for lens 2. The amount of light transmitted in lens 1 for the wavelength range 400–550 nm is computed from column 6 of Chart 5 where the percentage transmittance for each of the thirty-four bands is added and the total divided by 34. Similarly, the amount of light transmitted in lens 1 for the wavelength range 550–750 nm is computed from column 7 of Chart 5 where the percentage transmitted for each of the thirty-four bands is added and the total divided by 34. As shown in Chart 5, the total average percentage of light transmitted in the wavelength range 400–550 nm is 77.2% and the total average percentage of light transmitted in the wavelength range 550–750 is 83.8%. The amount of light transmitted in lens 2 for the wavelength range 400–555 nm is computed from Column 11 of Chart 5 where the percentage transmitted for each of the thirty-four bands is added and the total divided by thirty-four. Similarly, the amount of light transmitted in lens 2 for the wavelength range 550–750 nm is computed from Column 12 of Chart where the percentage transmitted for each of the thirty-four bands added and the total divided by thirty-four. As shown in Chart 5, the total average percentage of light transmitted in the wavelength range 400–550 nm is 57.4% and the total average percentage of light transmitted in the wavelength range 550–750 nm is 89.5%.

(2) Second, in order to reduce retinal rivalry, the amount of efficacy in aligned bands of the primary color in lens 1 and the complementary secondary color in lens 2 for the top twenty (20) bands must be within twelve percent (12%) and the amount of efficacy in aligned bands of the secondary color in lens 1 and the complementary primary color in lens 2 for the lower fourteen (14) bands must be within twelve percent (12%). Efficacy is what the eye actually processes from the available light. The cc color density determines the efficacy of what total light the wearer actually processes. Referring to Chart 6, the efficacy of the color blue for a given amount of color correction units is shown on the last column on the left side of the chart and the efficacy of the color yellow for a given amount of color correction units is shown on the last column of the right side of the chart. Based upon Chart 6, the amount of efficacy of each color in lens 1 for each band is set forth in column 8 and the amount of efficacy of each color in lens 2 for each band is set forth in column 13 in Chart 5. A comparison of each aligned band from lens 1 and lens 2 in Chart 5 shows that their respective efficacies are within twelve percent (12%) of each other.

(3) Third, to achieve greater apparent brightness, the color density at the upper portion of each lens is greatest and with the color density gradually decreasing as the bands go toward the bottom of the lens. For lens 1, referring to column 4 of Chart 5, it is seen that the greatest color density is in the first band, and each successive lower band has less color correction units. This pattern continues even after band 20 where the color changes from blue to yellow. For lens 2, referring to column 9 of Chart 5, it is seen that the greatest color density is in the first band, and each successive lower band has less color correction units. This pattern continues even after band 20 where the color changes from yellow to blue.

(4) Fourth, the bands of lens 1 and lens 2 are arranged so that for each band in lens 1 of a primary color, the aligned band in lens 2 is of the complementary secondary color and for each band in lens 2 of a secondary color, the aligned band in lens 1 is of the complementary primary color. With B standing for blue and Y standing for yellow, it is seen that each blue band in lens 1 is aligned with a yellow band in lens 2 and each yellow band in lens 1 is aligned with a blue band in lens 2.

Each lens is created by dipping the lengths in a coloring solution to a given depth and after the amount of cc's in that color has been impregnated into the lens, raising the lens so that the next band has more color density etc., until the highest color density is achieved at the uppermost band.

It will further be appreciated that when the final lens is viewed, the colors appear as gradients going from blue darkest at the top to blue lightest at band 20 and then yellow darkest at band 21 to yellow lightest at band 34 in lens 1 and yellow darkest at the top to yellow lightest at band 20 and then blue darkest at band 21 to blue lightest at band 34 for lens 2.

The amount of color embedded in each lens is in units of color correction units. For typical sunglasses, the preferred range of color correction units is 80 cc to 180 cc. However, the present invention will work in the range between 5 cc to 300 cc.

Regardless of which color combinations are used above, the lens 1 and lens 2 can each have ultraviolet filters and polarizing filters embedded in the lenses. The ultraviolet and polarizing filters can be embedded in the lens closer to the eye than the embedded color or further away from the eye than the embedded color, or can be permeated throughout the lens. The embedded color can also be embedded through the polarizing filters and the ultraviolet filters in each of the lenses. All variations work to achieve the beneficial results of the present invention.

Further, regardless of the colors that are used, lens 1 and lens 2 can be used in conjunction with corrective lenses. The dyes can be embedded in the lenses. The corrective lenses can be embedded in the lens closer to the eye than the embedded color or further away from the eye than the embedded color or the color can be permeated throughout the lens. The embedded color can also be embedded through the corrective lenses in each of the lenses. All variations work to achieve the beneficial results of the present invention.

While the present invention has been described for utilization primarily with sunglasses, it will be appreciated that the present invention can be used with any type of optics which require two lenses so that an eye views objects through one lens and the other of the user's eyes views objects through the other lens. In addition to sunglasses, by way of example, the optics can be corrective lenses, goggles, binoculars, or even contact lenses as the present invention can be embedded into corresponding contact lenses used with the left and right eye.

Defined in detail, the present invention is a pair of dual complementary optics having a first lens and a second lens, comprising: (a) said first lens having a gradient of thirty-four bands of approximately equal height, the uppermost nineteen bands having the color red embedded therein and the lowermost fifteen bands having the color cyan embedded therein, the amount of color correction units embedded in the uppermost red band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (b) said second lens having a gradient of thirty-four bands of approximately equal height, the uppermost nineteen bands having the color cyan embedded therein and the lowermost fifteen bands having the color red embedded therein, the amount of color correction units embedded in the uppermost cyan band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (c) each band with the color red embedded therein in said first lens aligned with a corresponding band in said second lens having the color cyan embedded therein and the efficacy of each respective band with red embedded therein within twelve percent of the efficacy of the aligned corresponding cyan band; and (d) each band with the color cyan embedded therein in said first lens aligned with a corresponding band in said second lens having the color red embedded therein and the efficacy of each respective band with cyan embedded therein within twelve percent of the efficacy of the aligned corresponding red band.

Also defined in detail, the present invention is a pair of dual complementary optics having a first lens and a second lens, comprising: (a) said first lens having a gradient of thirty-four bands of approximately equal height, the uppermost twenty bands having the color magenta embedded therein and the lowermost fourteen bands having the color green embedded therein, the amount of color correction units embedded in the uppermost magenta band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (b) said second lens having a gradient of thirty-four bands of approximately equal height, the uppermost twenty bands having the color green embedded therein and the lowermost fourteen bands having the color magenta embedded therein, the amount of color correction units embedded in the uppermost green band being the greatest in said second lens with the amount of color correction units successively decreasing in each lower band so that said second lens is darkest in the uppermost band and lightest in: the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (c) each band with the color magenta embedded therein in said first lens aligned with a corresponding band in said second lens having the color green embedded therein and the efficacy of each respective band with magenta embedded therein within twelve percent of the efficacy of the aligned corresponding green band; and (d) each band with the color green embedded therein in said first lens aligned with a corresponding band in said second lens having the color magenta embedded therein and the efficacy of each respective band with green embedded therein within twelve percent of the efficacy of the aligned corresponding magenta band.

Defined more broadly, the present invention is a pair of dual complementary optics having a first lens and a second lens, comprising: (a) said first lens having a gradient of thirty-four bands of approximately equal height, the uppermost twenty bands having the color blue embedded therein and the lowermost fourteen bands having the color yellow embedded therein, the amount of color correction units embedded in the uppermost blue band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (b) said second lens having a gradient of thirty-four bands of approximately equal height, the uppermost twenty bands having the color yellow embedded therein and the lowermost fourteen bands having the color blue embedded therein, the amount of color correction units embedded in the uppermost yellow band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (c) each band with the color blue embedded therein in said first lens aligned with a corresponding band in said second lens having the color yellow embedded therein and the efficacy of each respective band with blue embedded therein within twelve percent of the efficacy of the aligned corresponding yellow band; and (d) each band with the color yellow embedded therein in said first lens aligned with a corresponding band in said second lens having the color blue embedded therein and the efficacy of each respective band with yellow embedded therein within twelve percent of the efficacy of the aligned corresponding blue band.

Defined more broadly, the present invention is a pair of dual complementary optics having a first lens and second lens, comprising: (a) said first lens having a gradient of a multiplicity of bands, the uppermost series of bands having a primary color embedded therein and the lowermost series of bands having a complementary secondary color embedded therein, the amount of color correction units embedded in the uppermost primary colored band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550nm exceeding fifty percent and the average percentage of visible light transmitted by all bands in the wavelength range 550 nm to 750 nm exceeding fifty percent; (b) said second lens having a gradient of a multiplicity of bands, the uppermost series of having the secondary color embedded therein, which secondary color is the same as the secondary color in said first lens, and the lowermost series of bands having a primary color embedded therein, which primary color is the same as the primary color in said first lens, the amount of color correction units embedded in the uppermost secondary colored band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (c) each band with the primary color embedded therein in said first lens aligned with a corresponding band in said second lens having the complementary secondary color therein and the efficacy of each respective band with a primary color embedded therein within twelve percent of the efficacy of the aligned corresponding secondary colored band; and (d) each band with the secondary color embedded therein in said first lens aligned with a corresponding band in said second lens having the complementary primary color embedded therein and the efficacy of each respective band with the secondary color embedded therein within twelve percent of the efficacy of the aligned corresponding primary colored band in said second lens.

Also defined more broadly, the present invention is a pair of dual complementary optics having a first lens and second lens, comprising: (a) said first lens having a gradient of a multiplicity of bands, the uppermost series of bands having a primary color embedded therein and the lowermost series of bands having a complementary secondary color embedded therein, the amount of color correction units embedded in the uppermost primary colored band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (b) said second lens having a gradient of a multiplicity of bands, the uppermost series of bands having the secondary color embedded therein, which secondary color is the same as the secondary color in said first lens, and the lowermost series of bands having a primary color embedded therein, which primary color is the same as the primary color in said first lens, the amount of color correction units embedded in the uppermost secondary colored band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (c) each band with the primary color embedded therein in said first lens aligned with a corresponding band in said second lens having the complementary secondary color therein; (d) each band with the secondary color embedded therein in said first lens aligned with a corresponding band in said second lens having the complementary primary color embedded therein.

Defined most broadly, the present invention is a pair of dual complementary optics having a first lens and second lens, comprising: (a) said first lens having a gradient of a multiplicity of bands, the uppermost series of bands having a primary color embedded therein and the lowermost series of bands having a complementary secondary color embedded therein, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent; (b) said second lens having a gradient of a multiplicity of bands, the uppermost series of bands having the secondary color embedded therein, which secondary color is the same as the secondary color in said first lens, and the lowermost series of bands having a primary color embedded therein, which primary color is the same,as the primary color in said first lens, the average percentage of visible light transmitted by all bands in the wavelength range 400 run to 550 nm exceeding fifty percent and the average percentage of visible light transmitted by all bands in the wavelength range 550 nm to 750 nm exceeding fifty percent; (c) each band with the primary color embedded therein in said first lens aligned with a corresponding band in said second lens having the complementary secondary color therein; (d) each band with the secondary color embedded therein in said first lens aligned with a corresponding band in said second lens having the complementary primary color embedded therein.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A pair of dual complementary optics having a first lens and a second lens, comprising:

a. said first lens having a gradient of thirty-four bands of approximately equal height, the uppermost nineteen bands having the color red embedded therein and the lowermost fifteen bands having the color cyan embedded therein, the amount of color correction units embedded in the uppermost red band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;

b. said second lens having a gradient of thirty-four bands of approximately equal height, the uppermost nineteen bands having the color cyan embedded therein and the lowermost fifteen bands having the color red embedded therein, the amount of color correction units embedded in the uppermost cyan band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;

c. each band with the color red embedded therein in said first lens aligned with a corresponding band in said second lens having the color cyan embedded therein and the efficacy of each respective band with red embedded therein within twelve percent of the efficacy of the aligned corresponding cyan band; and d. each band with the color cyan embedded therein in said first lens aligned with a corresponding band in said second lens having the color red embedded therein and the efficacy of each respective band with cyan embedded therein within twelve percent of the efficacy of the aligned corresponding red band.

2. The invention as defined in claim 1, wherein said optics is a pair of sunglasses.

3. The invention as defined in claim 2, wherein said pair of sunglasses further comprises polarizing filters and ultraviolet filters.

4. The invention as defined in claim 1, wherein said optics is a pair of contact lenses.

5. The invention as defined in claim 1, wherein said optics is a pair of corrective lenses.

6. The invention as defined in claim 1, wherein said optics is a pair of binoculars.

7. The invention as defined in claim 1, wherein said optics is a pair of goggles.

8. A pair of dual complementary optics having a first lens and a second lens, comprising:
   a. said first lens having a gradient of thirty-four bands of approximately equal height, the uppermost twenty bands having the color magenta embedded therein and the lowermost fourteen bands having the color green embedded therein, the amount of color correction units embedded in the uppermost magenta band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;
   b. said second lens having a gradient of thirty-four bands of approximately equal height, the uppermost twenty bands having the color green embedded therein and the lowermost fourteen bands having the color magenta embedded therein, the amount of color correction units embedded in the uppermost green band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;
   c. each band with the color magenta embedded therein in said first lens aligned with a corresponding band in said second lens having the color green embedded therein and the efficacy of each respective band with magenta embedded therein within twelve percent of the efficacy of the aligned corresponding green band; and
   d. each band with the color green embedded therein in said first lens aligned with a corresponding band in said second lens having the color magenta embedded therein and the efficacy of each respective band with green embedded therein within twelve percent of the efficacy of the aligned corresponding magenta band.

9. The invention as defined in claim 8, wherein said optics is a pair of sunglasses.

10. The invention as defined in claim 9, wherein said pair of sunglasses further comprises polarizing filters and ultraviolet filters.

11. The invention as defined in claim 8, wherein said optics is a pair of contact lenses.

12. The invention as defined in claim 8, wherein said optics is a pair of corrective lenses.

13. The invention as defined in claim 8, wherein said optics is a pair of binoculars.

14. The invention as defined in claim 8, wherein said optics is a pair of goggles.

15. A pair of dual complementary optics having a first lens and a second lens, comprising:
   a. said first lens having a gradient of thirty-four bands of approximately equal height, the uppermost twenty bands having the color blue embedded therein and the lowermost fourteen bands having the color yellow embedded therein, the amount of color correction units embedded in the uppermost blue band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;
   b. said second lens having a gradient of thirty-four bands of approximately equal height, the uppermost twenty bands having the color yellow embedded therein and the lowermost fourteen bands having the color blue embedded therein, the amount of color correction units embedded in the uppermost yellow band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;
   c. each band with the color blue embedded therein in said first lens aligned with a corresponding band in said second lens having the color yellow embedded therein and the efficacy of each respective band with blue embedded therein within twelve percent of the efficacy of the aligned corresponding yellow band; and
   d. each band with the color yellow embedded therein in said first lens aligned with a corresponding band in said second lens having the color blue embedded therein and the efficacy of each respective band with yellow embedded therein within twelve percent of the efficacy of the aligned corresponding blue band.

16. The invention as defined in claim 15, wherein said optics is a pair of sunglasses.

17. The invention as defined in claim 16, wherein said pair of sunglasses further comprises polarizing filters and ultraviolet filters.

18. The invention as defined in claim 15, wherein said optics is a pair of contact lenses.

19. The invention as defined in claim 15, wherein said optics is a pair of corrective lenses.

20. The invention as defined in claim 15, wherein said optics is a pair of binoculars.

21. The invention as defined in claim 15, wherein said optics is a pair of goggles.

22. A pair of dual complementary optics having a first lens and second lens, comprising:
   a. said first lens having a gradient of a multiplicity of bands, the uppermost series of bands having a primary color embedded therein and the lowermost series of bands having a complementary secondary color embedded therein, the amount of color correction units embedded in the uppermost primary colored band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;

b. said second lens having a gradient of a multiplicity of bands, the uppermost series of bands having the secondary color embedded therein, which secondary color is the same as the secondary color in said first lens, and the lowermost series of bands having a primary color embedded therein, which primary color is the same as the primary color in said first lens, the amount of color correction units embedded in the uppermost secondary colored band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;

c. each band with the primary color embedded therein in said first lens aligned with a corresponding band in said second lens having the complementary secondary color therein and the efficacy of each respective band with a primary color embedded therein within twelve percent of the efficacy of the aligned corresponding secondary colored band; and d. each band with the secondary color embedded therein in said first lens aligned with a corresponding band in said second lens having the complementary primary color embedded therein and the efficacy of each respective band with the secondary color embedded therein within twelve percent of the efficacy of the aligned corresponding primary colored band in said second lens.

23. The invention as defined in claim 22, wherein said primary color is red and said secondary color is cyan.

24. The invention as defined in claim 22, wherein said primary color is green and said secondary color is magenta.

25. The invention as defined in claim 22, wherein said primary color is blue and said secondary color is yellow.

26. The invention as defined in claim 22, wherein said optics is a pair of sunglasses.

27. The invention as defined in claim 26, wherein said pair of sunglasses further comprises polarizing filters and ultraviolet filters.

28. The invention as defined in claim 22, wherein said optics is a pair of contact lenses.

29. The invention as defined in claim 22, wherein said optics is a pair of corrective lenses.

30. The invention as defined in claim 22, wherein said optics is a pair of binoculars.

31. The invention as defined in claim 22, wherein said optics is a pair of goggles.

32. A pair of dual complementary optics having a first lens and second lens, comprising:

a. said first lens having a gradient of a multiplicity of bands, the uppermost series of bands having a primary color embedded therein and the lowermost series of bands having a complementary secondary color embedded therein, the amount of color correction units embedded in the uppermost primary colored band being the greatest in said first lens with the amount of color correction units successively decreasing in each lower band so that said first lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;

b. said second lens having a gradient of a multiplicity of bands, the uppermost series of bands having the secondary color embedded therein, which secondary color is the same as the secondary color in said first lens, and the lowermost series of bands having a primary color embedded therein, which primary color is the same as the primary color in said first lens, the amount of color correction units embedded in the uppermost secondary colored band being the greatest in said second lens with the amount of color correction units successively decreasing in each lower band so that said second lens is darkest in the uppermost band and lightest in the lowermost band, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;

c. each band with the primary color embedded therein in said first lens aligned with a corresponding band in said second lens having the complementary secondary color therein;

d. each band with the secondary color embedded therein in said first lens aligned with a corresponding band in said second lens having the complementary primary color embedded therein.

33. The invention as defined in claim 32, wherein said primary color is red and said secondary color is cyan.

34. The invention as defined in claim 32, wherein said primary color is green and said secondary color is magenta.

35. The invention as defined in claim 32, wherein said primary color is blue and said secondary color is yellow.

36. The invention as defined in claim 32, wherein said optics is a pair of sunglasses.

37. The invention as defined in claim 36, wherein said pair of sunglasses further comprises polarizing filters and ultraviolet filters.

38. The invention as defined in claim 32, wherein said optics is a pair of contact lenses.

39. The invention as defined in claim 32, wherein said optics is a pair of corrective lenses.

40. The invention as defined in claim 32, wherein said optics is a pair of binoculars.

41. The invention as defined in claim 32, wherein said optics is a pair of goggles.

42. The invention as defined in claim 32, wherein the efficacy of each respective band with a primary color embedded therein is within twelve percent of the efficacy of the aligned corresponding secondary colored band.

43. A pair of dual complementary optics having a first lens and second lens, comprising:

a. said first lens having a gradient of a multiplicity of bands, the uppermost series of bands having a primary color embedded therein and the lowermost series of bands having a complementary secondary color embedded therein, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;

b. said second lens having a gradient of a multiplicity of bands, the uppermost series of bands having the secondary color embedded therein, which secondary color is the same as the secondary color in said first lens, and the lowermost series of bands having a primary color embedded therein, which primary color is the same as the primary color in said first lens, the average percentage of visible light transmitted by all bands in the wavelength range 400 nm to 550 nm exceeding fifty percent and the average percentage of visible light transmitted by all bands in the wavelength range 550 nm to 750 nm exceeding fifty percent;

c. each band with the primary color embedded therein in said first lens aligned with a corresponding band in said second lens having the complementary secondary color therein;

d. each band with the secondary color embedded therein in said first lens aligned with a corresponding band in said second lens having the complementary primary color embedded therein.

44. The invention as defined in claim 43, wherein said primary color is red and said secondary color is cyan.

45. The invention as defined in claim 43, wherein said primary color is green and said secondary color is magenta.

46. The invention as defined in claim 43, wherein said primary color is blue and said secondary color is yellow.

47. The invention as defined in claim 43, wherein said optics is a pair of sunglasses.

48. The invention as defined in claim 47, wherein said pair of sunglasses further comprises polarizing filters and ultraviolet filters.

49. The invention as defined in claim 43, wherein said optics is a pair of contact lenses.

50. The invention as defined in claim 43, wherein said optics is a pair of corrective lenses.

51. The invention as defined in claim 43, wherein said optics is a pair of binoculars.

52. The invention as defined in claim 43, wherein said optics is a pair of goggles.

53. The invention as defined in claim 43, wherein the efficacy of each respective band with a primary color embedded therein is within twelve percent of the efficacy of the aligned corresponding secondary colored band.

* * * * *